United States Patent [19]

Akao

[11] Patent Number: 5,023,120
[45] Date of Patent: Jun. 11, 1991

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Minami-Ashigara, Japan

[21] Appl. No.: 443,241

[22] Filed: Dec. 4, 1989

[30] Foreign Application Priority Data

Dec. 5, 1988 [JP] Japan .................. 63-305945

[51] Int. Cl.$^5$ ............................... B29D 22/00
[52] U.S. Cl. .................... 428/35.9; 428/216; 428/461; 428/35.8
[58] Field of Search .............. 428/461, 35.8, 35.9, 428/216

[56] References Cited

U.S. PATENT DOCUMENTS

| | | | |
|---|---|---|---|
| 4,147,291 | 4/1979 | Akao et al. | 428/910 |
| 4,258,848 | 3/1981 | Akao et al. | 206/524.4 |
| 4,331,725 | 5/1982 | Akao | 428/138 |
| 4,337,285 | 6/1982 | Akao et al. | 428/349 |
| 4,356,224 | 10/1982 | Akao et al. | 428/220 |
| 4,359,499 | 11/1982 | Akao et al. | 428/201 |
| 4,386,124 | 5/1983 | Akao | 428/463 |
| 4,411,943 | 10/1983 | Akao | 428/161 |
| 4,411,945 | 10/1983 | Akao et al. | 428/216 |
| 4,436,809 | 3/1984 | Akao et al. | 428/209 |
| 4,452,846 | 6/1984 | Akao | 428/461 |
| 4,469,741 | 9/1984 | Akao | 428/214 |
| 4,513,050 | 4/1985 | Akao | 428/200 |
| 4,565,733 | 1/1986 | Akao | 428/910 |
| 4,565,743 | 1/1986 | Akao | 428/522 |
| 4,576,865 | 3/1986 | Akao | 428/335 |
| 4,579,781 | 4/1986 | Akao | 428/461 |
| 4,584,234 | 4/1986 | Hirose et al. | 428/323 |
| 4,587,175 | 5/1986 | Akao | 428/596 |
| 4,629,640 | 12/1986 | Akao | 428/216 |
| 4,639,386 | 1/1987 | Akao | 428/35 |
| 4,653,640 | 3/1987 | Akao | 206/455 |
| 4,661,395 | 4/1987 | Akao | 428/213 |
| 4,661,401 | 4/1987 | Akao | 428/216 |
| 4,663,218 | 5/1987 | Akao | 428/212 |
| 4,687,692 | 8/1987 | Akao | 428/137 |
| 4,708,896 | 11/1987 | Akao | 428/35 |
| 4,730,778 | 3/1988 | Akao et al. | 206/409 |
| 4,778,712 | 10/1988 | Akao | 428/213 |
| 4,778,713 | 10/1988 | Akao | 428/215 |
| 4,784,906 | 11/1988 | Akao | 428/324 |
| 4,787,506 | 11/1988 | Akao | 206/395 |
| 4,796,823 | 1/1989 | Akao et al. | 242/71.8 |
| 4,844,961 | 7/1989 | Akao | 428/36.92 |
| 4,871,613 | 10/1989 | Akao | . |
| 4,876,125 | 10/1989 | Akao | . |
| 4,876,129 | 10/1989 | Akao | . |
| 4,894,264 | 1/1990 | Akao | 428/34.2 |
| 4,903,834 | 2/1990 | Akao | 206/410 |
| 4,906,517 | 3/1990 | Akao | 428/216 |
| 4,925,711 | 5/1990 | Akao | . |

Primary Examiner—Edith Buffalow
Attorney, Agent, or Firm—Burns, Doane, Swecker & Mathis

[57] ABSTRACT

A packaging material which comprises an aluminum foil or an aluminum-metallized biaxially stretched thermoplastic resin film and a polyolefin resin film having an elongation at rupture (JIS P 8113) in either of longitudinal or lateral direction of more than 1.5 times of that of the aluminum foil or the aluminum-metallized film laminated thereto through a modified polyolefin resin adhesive layer containing an adhesive polyolefin resin which is a graft modified polyolefin resin. The packaging material of the invention can be torn easily by hand, and therefore, taking out work is carried out safely and rapidly even in a dark room. Nevertheless, the physical strength and tear strength are great and, light-shielding can be secured safely. Such a packaging material can be manufactured inexpensively.

5 Claims, 1 Drawing Sheet

PACKAGING MATERIAL FOR PHOTOSENSITIVE MATERIALS

BACKGROUND OF THE INVENTION

1. Field of the Invention

This invention relates to a packaging material for photosensitive materials such as photographic photosensitive materials.

2. Description of the Prior Art

Since the qualities of photographic photosensitive materials are damaged by even small amounts of light, gas or moisture, it is necessary that packaging materials have light-shielding, gas barrier and moistureproofness. Moreover, it is also required to have sufficient heat seal strength and physical strength in order to prevent pinholes, ruptures and punctures, through packaging, stocking and physical distribution.

Heretofore, as the packaging material having such properties, there are cross laminated films using two uniaxially stretched high density polyethylene resin films (U.S. Pat. No. 4,147,291) and laminated films containing a linear low density polyethylene resin film (U.S. Pat. No. 4,452,846).

Incidentally, photographic photosensitive materials placed in a sealing bag are carried in a dark room, and taken out of the bag there. Therefore, the bag cable of opening by hand without using a cutter is preferred in view of safety. However, the above conventional packaging materials are difficult to be opened by hand, though they are excellent in physical strength and heat seal strength. Therefore, the inventor developed a packaging material easily openable by hand composed of an aluminum foil, a light shielding heat seal film layer having a prescribed resin composition laminated to one side of the aluminum foil in a delamination resistance stronger than a prescribed value through an anchor coat layer, and a restricted flexible sheet layer laminated to the other side (U.S. Pat. No. 4,708,896). However, the cost of the above packaging material is increased by the process for providing the anchor coat layer including the loss produced until the coating speed reaches a prescribed value and the loss produced by trimming both sides of the web-shaped packaging material. Moreover, the anchor coat layer is extremely thin, and it is difficult to coat in an uniform thickness resulting in variable openability.

SUMMARY OF THE INVENTION

An object of the invention is to provide a packaging material easily openable by hand nevertheless having a sufficient physical strength and heat seal strength.

Another object of the invention is to provide a packaging material easily openable by hand having uniform openability.

Another object of the invention is to provide a packaging material easily openable by hand and being inexpensive.

The present invention provides a packaging material achieving the above objects which comprises an aluminum foil or an aluminum-metallized biaxially stretched thermoplastic resin film and a polyolefin resin film having an elongation at rupture (JIS P 8113) in either the longitudinal or lateral direction of more than 1.5 times that of the aluminum foil or the aluminum-metallized film laminated thereto through a modified polyolefin resin adhesive layer containing an adhesive polyolefin resin which is a graft modified polyolefin resin.

Figure 1:
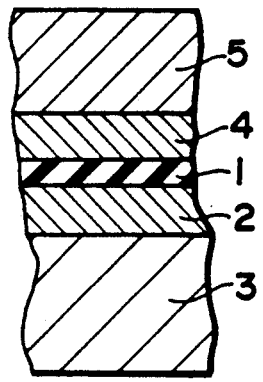
FIGS. 1 through 6 are partial sectional views of the packaging materials embodying the invention.

1: Aluminum foil
2: Modified polyolefin resin adhesive layer
3: Polyolefin resin film
9: Aluminum-metallized biaxially stretched thermoplastic resin film

DETAILED DESCRIPTION OF THE PREFERRED EMBODIMENTS

A suitable thickness of the aluminum foil is 5 to 70 $\mu$m. The elongation at rupture of the aluminum foil is preferably less than 300%, particularly less than 100% in both the longitudinal and lateral directions in view of securing good tearability in both directions.

The aluminum-metallized biaxially stretched thermoplastic resin film is composed of a biaxially stretched thermoplastic resin film on which an aluminum membrane is deposited.

The resin forming the biaxially stretched thermoplastic resin film may be polyester resin, polyamide (nylon) resin, polyethylene resin, polystyrene resin, polypropylene resin, polyolefin copolymer resin, polyvinyl chloride resin, polyvinylidene chloride resin, saponification polyvinyl alcohol resin, random and block copolymer resins of these resins and other resins including ternary or more copolymers as well as binary copolymers, and blends of the above resins and other resins. The polyester resin may be synthesized from dimethyl terephthalate and ethylene glycol, dimethyl terephthalate and 1,4-cyclohexanedimethanol, dimethyl terephthalate and dimethyl isophthalate, and the like. The polyamide resin includes nylon 6, nylon 66, nylon 12, nylon 11 and copolymer resin of nylon 6-66. The thermoplastic resin film may be a single layer film or a coextruded multilayer film composed of two or more layers. The biaxially stretched thermoplastic resin film is formed by simultaneously biaxial stretching or successively biaxial stretching using a T die film molding machine or an inflation film molding machine provided with a biaxially stretching mechanism. A suitable drawing ratio is 1.5 to 20 times, preferably 3 to 15 times in both directions of the longitudinal direction (MD) and the lateral direction (CD). The thickness of the biaxially stretched thermoplastic resin film is preferably 5 to 50 $\mu$m in view of thinning, reducing the cost and securing the physical strength of the packaging material. When the thickness is less than 5 $\mu$m, longitudinal streaks or cuts are liable to occur in the lamination process. While, when the thickness is beyond 50 $\mu$m, the rigidity of the film is too great. As a result, the bag-making ability, Gelbo test strength and handling of the film is inferior, and the film is expensive. The difference of the elongation at rupture between the longitudinal direction and the lateral direction is preferably less than 2 times, particularly 1.5 times in view of facilitating the tear of the film by hand irrespective of direction.

A suitable thickness of the aluminum membrane is 55 to 1200 Å in view of securing physical strength, light-shielding, antistatic property, moistureproofness and gas barrier as well as cost and quality, in the laminated film. When the thickness is less than 55 Å, static electrification generated on both sides of the aluminum membrane cannot be eliminated. While, when the thickness is beyond 1200 Å, the heat in the vacuum deposition process degrades the biaxially stretched thermoplastic resin film and decreases the physical strength of the laminated film, though antistatic property, gas barrier, moistureproofness and light-shielding can be secured. A preferred thickness is 80 to 800 Å, and 100 to 600 Å is particularly preferred. The aluminum membrane may be formed by a known method such as vacuum deposition, sputtering, ion plating or electron beam heating. The aluminum membrane may be provided on one face or on both faces of the biaxially stretched thermoplastic resin film.

It is preferable that the surface of the biaxially stretched thermoplastic resin film is coated with an anchor coating agent or treated with corona discharge. The adhesive strength of the aluminum membrane increases by the above treatment.

Since the metal membrane layer is easily abraded and separated, a protection layer is preferably provided on the metal membrane layer. The usable resin for the protection layer includes butyral resin, acrylic resin, cellulose resins such as cellulose acetate resin, urethane resin, epoxy resin, polyester resin, ionomer resin, ethylene-ethyl acrylate copolymer resin, various polyethylene resins and various polypropylene resins. Besides, wax, gelatin, polyvinyl alcohol or the like is also usable. The thickness of the protection layer is made extremely thin such as thinner than 50 μm, preferably thinner than 5 μm, in order to eliminate static electrifity effectively. Such a protection layer may be formed by a known extrusion coating, solution coating or spray coating.

The elongation at rupture of the aluminum-metallized biaxially stretched thermoplastic resin film is preferably less than 300% in both longitudinal and lateral directions, and the difference of the elongation at rupture between the longitudinal direction and the lateral direction is preferably less than 2 times.

The polyolefin resin film is composed of a polyolefin resin, such as polyethylene resin, ethylene copolymer resin or polypropylene resin, as the principal component. Ethylene copolymer resins are preferred in view of improving heat sealing properties, bag rupture strength and impact puncture strength. Representative ethylene copolymer resins are ethylene-vinyl acetate copolymer resin, ethylene-propylene copolymer resin, ethylene-1-butene copolymer resin, ethylene-butadiene copolymer resin, ethylene-vinyl chloride copolymer resin, ethylene-methylmethacrylate copolymer resin, ethylene-methyl acrylate copolymer resin, ethylene-ethyl acrylate copolymer (EEA) resin, ethylene-acrylonitrile copolymer resin, ethylene-acrylic acid copolymer resin, ionomer resin (copolymer of ethylene and unsaturated acid crosslinked through zinc), ethylene-α-olefin copolymer (L-LDPE) resin, ethylene-propylene-butene-1 ternary copolymer resin, and the like. Among the above ethylene copolymer resins, L-LDPE resin and EEA resin are preferred, because they are excellent in film moldability and heat sealing properties and yield high bag rupture strength, impact puncture strength and tear strength.

The L-LDPE resin is called a third polyethylene resin, and it is a low cost high strength resin, having the advantages of both low, medium density polyethylene resin and high density polyethylene resin, which meets the requirements, i.e. resource conservation and energy conservation, of the times. The L-LDPE resin is a copolymer of ethylene and α-olefin, and it has a linear structure having short branches. The number of carbon atoms of the α-olefin is 3 to 13. Preferable α-olefins have a number of carbon atoms of 4 to 10, and examples of the α-olefin are butene-1, 4-methylpentene-1, hexene-1, heptene-1 and octene-1. The density is usually in the range of 0.87 to 0.95 g/cm$^3$, and the melt index in usually 0.1 to 50 g/10 minutes. Most of the L-LDPE resin is synthesized by low pressure method, and partly synthesized by modified high pressure method. Examples of commercial L-LDPE resin are "G-Resin" and "TUFLIN" and "NUC-FLX" (UCC), "NUC Polyethylene-LL" and "TUFTHENE" (Nippon Unicar) "Excelene VL" (Sumitomo Chemical), "Idemitsu Polyethylene-L" and "Moretec" (Idemitsu Petrochemical), "Dowlex" (Dow Chemical), "Suclear" (DuPont de Nemour, Canada), "Marlex" (Phillips), "Neozex" and "Ultzex" (Mitsui Petrochemical Industries), "Nisseki Linirex" (Nippon Petrochemicals), "Mitsubishi Polyethy-LL" (Mitsubishi Petrochemical), "Stamilex" (DSM), and the like. Preferable L-LDPE resins are copolymers of ethylene and α-olefin of which the number of carbon atoms is 6 to 8 having a melt index (MI) of 0.8 to 10 g/10 minutes (ASTM D-1238) and a density of 0.870 to 0.940 g/cm$^3$ (ASTM D-1505) manufactured by liquid process or vapor process. Extremely low density L-LDPE resins having a density of less than 0.910 g/cm$^3$ are also preferred.

The EEA resin is not restricted, and commercial EEA resins have, for example, a comonomer content of 7 to 41%, a MI of 1.5 to 1500 g/10 minutes (ASTM D-1238), a density of 0.93 to 0.95 g/cm$^3$ (ASTM D-1505) an embrittlement temperature of $-40°$ C. to less than $-75°$ C. (ASTM D-746) and a tensile strength of 14 to 160 kg/cm$^2$ (ASTM D-638).

The elongation at rupture (JIS P 8113) in either the longitudinal or lateral direction of the polyolefin resin film is more than 1.5 times of that of the aluminum foil or the aluminum-metallized film. The above elongation is measured at a drawing speed of 500 mm/min. When the elongation at rupture is less than 1.5 times, pinholes, ruptures and punctures are liable to occur. The thickness of the polyolefin resin film is preferably 15 to 100 μm.

The aluminum foil or the aluminum metallized biaxially stretched thermoplastic resin film is laminated to the polyolefin resin film through the modified polyolefin resin adhesive layer composed of adhesive polyolefin resin and unmodified polyolefin resin as principal components.

The adhesive polyolefin resin is an modified polyolefin resin which is a polyolefin resin modified by grafting an unsaturated carboxylic acid compound, and includes graft-modified polyethylene resin, graft-modified polypropylene resin, graft-modified ethylene copolymer resin and graft-modified poly-α-olefin resin such as graft-modified polybutene-1 resin and graft-modified poly-4-methylpentene-1 resin.

The unsaturated carboxylic acid compound usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid, en-cis-bicyclo[2,2,1]-hepto-5-en-2,3-dicarboxylic acid, maleic anhydride, itaconic anhydride, citraconic anhydride, aconitic anhydride, methyl acrylate, methyl methacrylate, ethyl methacrylate, ethyl acrylate, n-butyl acrylate, glycidyl acrylate, glycidyl methacrylate, glycidyl maleate n-butyl methacrylate, maleic acid monoethyl ester, maleic acid diethyl ester, fumaric acid monomethyl ester, fumaric acid dimethyl ester, itaconic acid diethyl ester, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide malemide, N-butylmaleimide, N-phenylmaleimide, malonyl chloride, monomethylmaleate, dimethylmaleate, dipropylmaleate, potassium acrylate, sodium acrylate, zinc acrylate, magnesium acrylate, calcium acrylate, sodium methacrylate, potassium methacrylate, or the like. Two or more unsaturated carboxylic acid compounds may be combined. Preferable unsaturated carboxylic acid compounds are acrylic acid, maleic acid, maleic anhydride and maleic anhydride is particularly preferred. A suitable amount of the unsaturated carboxylic acid compound is 0.01 to 20 parts by weight, preferably 0.2 to 5 parts by weight, per 100 parts by weight of the polyolefin base resin in view of securing adhesive strength.

The grafting modification method may be any known method, such as the method of reacting in a melted state disclosed in Japanese Patent KOKOKU No. 43-27421, the method of reacting in a solution state disclosed in Japanese Patent KOKOKU No. 44-15422, the method of reacting in a slurry state disclosed in Japanese Patent KOKOKU No. 43-18144 and the method of reacting in a vapor state disclosed in Japanese Patent KOKOKU No. 50-77493. Among them, the melting method using an extruder is preferred because of simple operation and inexpensiveness.

A peroxide is added in order to accelerate the reaction between the polyolefin base resin and the unsaturated carboxylic acid, Suitable peroxides are organic peroxides such as benzoyl peroxide, lauroyl peroxide, dicumyl peroxide,$\alpha,\alpha'$-bis(t-butylperoxydiisopropyl)-benzene, 2,5-dimethyl-2,5-di(t-butylperoxy)hexane, 2,5-dimethyl-2,5-di(t-butylperoxy)hexyne, di-t-butyl peroxide, cumene hydroperoxide, t-butyl-hydroperoxide, t-butylperoxylaurate, t-butylperoxybenzoate, 1,3-bis(t-butylperoxyisopropyl) benzene, di-t butyl-diperoxyphthalate, t-butylperoxymaleic acid and isopropyl percarbonate, azo compounds such as azobisisobutyronitrile, and inorganic peroxides such as ammonium persulfate. Two or more peroxides may be combined. Suitable peroxides are di-t-butylperoxide, dicumylperoxide, 2,5-dimethyl-2,5-di(t-butylperoxy)hexane, 2,5-dimethyl-2,5-di(t-butylperoxy)hexyne and 1,3-bis(t-butylperoxyisopropyl) benzene, having a decomposition temperature between 170° C. and 200° C. A suitable amount of the peroxide is 0.05 to 5 parts by weight, preferably 0.01 to 1 part by weight per 100 parts by weight of the polyolefin base resin.

There are commercial adhesive polyolefin resins, such as "N polymer" (Nippon Petrochemicals), "Admer" (Mitsui Petrochemical Industries), "ER Resin" (Showa Denko), "Novatec-AP" (Mitsubishi Chemical Industries), "Modic" (Mitsubishi Petrochemical) and "NUC-Ace" (Nippon Unicar).

The unmodified polyolefin resin is polyethylene resin, polypropylene resin, ethylene copolymer resin, poly-$\alpha$-olefin resin such as polybutene-1 resin or poly-4-methylpentene-1 resin, or the like.

A suitable content of the adhesive polyolefin resin is more than 3 wt. %, preferably 7 to 70 wt. %, more preferably 10 to 50 wt. %, i.e. a suitable content of the unmodified polyolefin resin is less than 97 wt. %. The thickness of the modified polyolefin resin adhesive layer is more than 7 $\mu$m, preferably 10 to 60 $\mu$m.

The adhesive strength between the aluminum foil and the polyolefin resin film is more than 300 g/15 mm width, preferably more than 350 g/15 mm width. The adhesive strength between the aluminum-metallized biaxially stretched thermoplastic resin film and the polyolefin resin film is also more than 300 g/15 mm width preferably more than 350 g/15 mm width, and more than 400 g/15 mm width is particularly preferred. The above adhesive strength can be obtained by using the modified polyolefin resin adhesive layer. In the case of the aluminum-metallized film, a notch is preferably formed in order to improve tearability by hand.

In order to improve the adhesive strength of the aluminum layer such as the adhesive strength between the aluminum membrane and the biaxially stretched thermoplastic resin film or the adhesive strength between the aluminum foil and the polyolefin resin film, physical surface treatment or AC agent treatment may be provided.

Representative examples of the physical surface treatment are described below. Two or more kinds of the physical surface treatment may be combined, or the physical surface treatment may be combined with the coating of an anchor coating agent.

Flame treatment: Running cost is high, and there is the danger of fire.

Plasma treatment: Argon gas is converted into plasma, and joining surface is treated with the plasma. The treating strength is several times as much as corona discharge treatment, but the equipment cost for plasma treatment is several tens higher than corona discharge treatment.

Corona discharge treatment: Treatable materials are various polymer films and sheets, aluminum foil, aluminum vacuum metallized film, etc. This inexpensive treatment is widely utilized, and the treated effect is large.

Sandblasting treatment: Sand such as silica sand is blasted at a high pressure to the joining surface, and the surface is made rough.

Chemical agent treatment: Treated with a dichromate solution or etc.

Ozone treatment: Treated in a box filled with ozone gas. Even though the resin temperature of extrusion laminating is lowered, the adhesive strength is still improved.

Preheat treatment: The flexible sheet to be conducted with extrusion laminating is preheated with a heat drum, hot air or etc.

Ultraviolet irradiation

High-frequency heating

Dielectric heating

Microwave heating, etc.

Anchor coating (AC) agent is a generic name of adhesive promoter and cross-linking agent used in the field of laminating, and it is also called primer. Representative examples of the anchor coating agent are as follows:

Organic titanate anchor coating agent
  Tetrapropyl titanate or tetraisobutyl titanate is used as the principal constituent, and tetrastearyl titanate is added as a hydrolysis-adjusting agent.

Polyethyleneimine anchor coating agent
  A relatively high polymer of ethyleneimine —CH$_2$—CH$_2$—NH—$_n$ is used. This agent is particularly preferred because its handling is easy and its pot life is long.

Polyisocyanate anchor coating agent
  One-component type; Polymer having isocyanate group alone
  Two-component type; Combination of a polymer having isocyanate group and a polyester having OH group
  A chemical reaction such as a crosslinking reaction occurs in both types, and an adhesive effect appears. Pot life is short, and this coating agent is expensive.

Polyester and urethane anchor coating agent
  Saturated polyester resin or urethane resin is dissolved in a solvent such as ethyl acetate or toluene.

Polyolefin anchor coating agent
Polybutadiene anchor coating agent

The anchor coat layer is preferably made extremely thin. The coating method may be gravure roll coating, kiss roll coating, curtain coating, bar coating, reverse roll coating, direct roll coating, air knife coating or the like.

A heat-resistant flexible sheet may be laminated onto the outside of the aluminum foil or the aluminum-metallized biaxially stretched thermoplstic resin film. The flexible sheet includes various thermoplastic resin films such as various polyethylene resin films, ethylene copolymer resin films, polypropylene resin films, polyvinyl chloride resin films, polyvinylidene chloride resin films, polyamide resin films, polycarbonate resin films, polyester resin films, their modified resin films and their biaxially stretched films. Various other flexible sheets such as metallized film including aluminum-metallized film, cellulose acetate film, cellophane film, regenerated cellulose film, saponification polyvinyl alcohol resin film, paper, synthetic paper, metal foil including aluminum foil, nonwoven fabric are also usable. Particularly preferred flexible sheets are various papers not affecting photosensitive materials adversely having an areal weight of 20 to 400 g/m$^2$, such as nonwoven fabric and unbleached kraft paper, semibleached kraft paper, bleached kraft paper, twisting paper, Clupak paper, Duostress paper, patent-coated board, paper for photograph, pure white roll paper, coated paper, simili and glassine paper. Other preferable flexible sheets have a melting point higher than the polyolefin resin film by 10° C. or more, in view of improving bag-making ability and appearance.

A light-shielding material may be added. Examples of the light-shielding materials are described below.

Inorganic Compounds:
Oxides: silica, diatomaceous earth, alumina, titanium oxide, iron oxide, zinc oxide, magnesium oxide, antimony oxide, barium ferrite, strontium ferrite, beryllium oxide, pumice, pumice balloon, alumina fiber, etc.
Hydroxides: aluminum hydroxides, magnesium hydroxides, basic magnesium carbonate, etc.
Carbonates: calcium carbonate, magnesium carbonate, dolomite, etc.
Sulfates, sulfites: calcium sulfate, barium sulfate, ammonium sulfate, calcium sulfite, etc.
Silicates: talc, clay, mica, asbestos, glass fiber, glass balloon, glass bead, calcium silicate, montmorillonite, bentonite, etc.
Carbons: carbon black, graphite, carbon fiber, carbon hollow bead, etc.
Others: iron powder, copper powder, lead powder, aluminum powder, molybdenum sulfide, boron fiber, silcon carbide fiber, brass fiber, potassium titanate, lead titanate zirconate, zinc borate, barium metaborate, calcium borate, sodium borate, aluminum paste, etc.

Organic Compounds:
  wood flour such as pine, oak and sawdust, husk fiber such as almond, peanut and chaff, cotton, jute, paper piece, cellophane piece, nylon fiber, polypropylene fiber, starch, aromatic polyamide fiber, etc.

Among them, preferred light-shielding materials are opaque, and light-absorptive carbon black, titanium nitride and graphite are particularly preferred because of being excellent in heat resistance and light resistance and being relatively inactive.

Carbon blacks are divided into gas black, oil furnace black, channel black, anthracene black, acetylene black, Ketchen carbon black, thermal black, lamp black, vegetable black and animal black according to their origin. Among these, oil furnace carbon black is preferable in terms of light-shielding character, cost and improvement of properties. On the other hand, since acetylene black and Ketschen carbon black have an antistatic character, they are also preferable, though they are expensive. They may be blended to the oil furnace black in order to improve its character. Particularly preferable carbon black for the packaging material for photographic photosensitive materials is oil furnace carbon black having a pH of 6 to 9, a mean particle size of 10 to 120 m$\mu$, a volatile components content of less than 2% and an oil absorption value of more than 50 ml/100 g in view of no occurrence of fogging, rare occurrence of photosensitivity deviation and great light-shielding ability. Moreover, when it is blended with L-LDPE resin, lumps of carbon black and fish eyes rarely occur.

A preferable light-shielding material content renders the optical density of the packaging material more than 5. The light-shielding material is preferably incorporated into the inside layer to touch the packaged article in order to make light-shielding more effective. As the form of the light-shielding material, there are powder coloring agent, paste coloring agent, wet coloring agent, masterbatch, dye, colored pellets, etc. Though, there are various blending methods, the masterbatch method is preferred in view of cost and the contamination of the working place. Japanese Patent KOKOKU No. 40-26196 discloses a method of making a masterbatch of polymer-carbon black by dissolving the polymer in an organic solvent and dispersing he carbon black into the solution. Japanese Patent KOKOKU No. 43-10362 discloses another method of making a masterbatch by dispersing the carbon black into polyethylene.

To add 0.01 to 5 wt. % of a lubricant is preferred in order to improve extruding ability and film forming ability and to prevent static electrification. In the case of fatty acid amide lubricant, it sharply improves slipping character. However, since it is liable to bleed out, the content is preferably 0.01 to 1 wt. %. The lubricants not affecting photographic film adversely are:
Oleic acid amide lubricants; "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; dimethylpolysiloxanes, etc. (Shinetsu Chemical Co., Ltd., Toray Silicone Co., Ltd.), etc.

Alkylamine lubricants; "ELECTROSTRIPPER TS-2" (Kao Corp.), etc.

Hydrocarbon lubricants; liquid paraffin, natural paraffin, microwax, synthetic paraffin, polyethylene wax, polypropylene wax, chlorinated hydrocarbon, fluorocarbon, etc.

Fatty acid lubricants; higher fatty acids preferably more than $C_{12}$, hydroxy fatty acids, etc.

Ester lubricants; fatty acid lower alcohol esters, fatty acid polyol esters, fatty acid polyglycol esters, fatty acid fatty alcohol esters, etc.

Alcohol lubricants; polyols, polyglycols, polyglycerols, etc.

Metallic soap; metal salts such as Li, Mg, Ca, Sr, Ba, Zn, Cd, Al, Sn, Pb salts of higher fatty acids such as lauric acid, stearic acid, ricinoleic acid naphthenic acid, oleic acid, etc.

The addition of a conductive material is preferred in order to prevent troubles caused by static electricity. Suitable conductive materials are nonionic surfactants such as sulfonate salts, anionic surfactants such as polyoxyethylene glycols, cationic surfactants such as quaternary ammonium salts, ampholytic surfactants, alkylamine derivatives, fatty acid derivatives, various lubricants, carbon black, graphite, metal surface coating pigments, metal powder, metal flake, carbon fiber, metal fiber, whisker such as potassium titanate, aluminum nitride and alumina, etc. Examples of the nonionic surfactants are polyethylene glycol fatty acid esters, polyoxyethylene sorbitan fatty acid esters, polyoxyethylene fatty alcohol ethers, polyoxyethylene alkylphenyl ethers, polyoxyethylene glycerine fatty acid esters, polyoxyethylene fatty amines, sorbitan monofatty acid esters, fatty acid pentaerythritol, ethylene oxide adducts of fatty alcohols, ethylene oxide adducts of fatty acids, ethylene oxide adducts of amino fatty acids or fatty acid amides, ethylene oxide adducts of alkylphenols, ethylene oxide adducts of alkylnaththols, ethylene oxide adducts of partial fatty acid esters of polyols, other nonionic surfactants disclosed on page 120 of Japanese Patent KOKOKU No. 63-26697. Examples of the anionic surfactants are sodium salt of ricinoleic acid sulfate ester, various metal salts of fatty acids, ricinolate ester sulfate ester sodium salt, sulfated ethylamiline oleate, sulfate esters of olefins, sodium salt of oleyl alcohol sulfate ester, alkylsulfate ester salts, fatty acid ethylsulfonate salts, alkylsulfonate salts, alkyl naththalene sulfonate salts, alkylbenzene sulfonate salts, succinate ester sulfonate salts, phosphate ester salts, etc. Examples of the cationic surfactants are primary amine salts, tertiary amine salts, quaternary ammonium salts, pyridine derivatives, etc. Examples of the ampholytic surfactants are carboxylic acid derivatives, imidazoline derivatives, betaine derivatives, etc.

To add an antioxidant is preferred in order to prevent coloring troubles and the like. Suitable antioxidants are described below.

Phenol Antioxidants:
6-t-butyl-3-methylphenol derivatives, 2,6-di-t-butyl-p-cresol-t-butylphenol, 2,2'-methylenebis-(4-ethyl-6-t-butylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-thiobis(3-methyl-6-t-butylphenol, 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t-butyl-4'-hydroxyphenyl) propionate]methane, etc.

Ketone-Amine Condensate Antioxidants:
6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:
Phenyl-α-naphthylamine, N-phenyl-β-naphthylamine, N-phenyl-N'-isopropyl-p-phenylenediamine, N,N'-diphenyl-p-phenylenediamine, N,N'-di-p-naphthyl-p-phenylenediamine, N-(3'-hydroxybutylidene)-1-naphtylamine, etc.

Imidazole Antioxidants:
2-mercaptobenzoimidazole, zinc salt of 2-mercaptobenzoimidazole, 2-mercaptomethylbenzoimidazole, etc.

Phosphite Antioxidants:
Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:
Thiourea derivatives, 1,3-bis(dimethylaminopropyl)-2-thiourea, etc.

Other Antioxidants:
Those useful for air oxidation, such as dilauryl thiodipropionate, etc.

Preferable antioxidants are phenol antioxidants, and particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.), dilaurylthiodipropionate, distearylthiodipropionate, dialkylphosphate, etc. Two or more antioxidants may be combined. A suitable content of the antioxidant in the polyolefin resin adhesive layer is 0.01 to 2 wt. %. When the content is less than 0.01 wt. %, the blending effect is small. While, when the content is beyond 2 wt. %, photographic film utilizing oxidation-reduction reaction is adversely influenced by antioxidant. In order to avoid the adverse influence, the content of antioxidant is a minimum amount capable of preventing coloring troubles and generation of lumps. When the antioxidant is combined with carbon black, the oxidation inhibition effect synergistically appears. Besides, other antioxidants usable in the invention can be selected from those disclosed in "Plastic Data Handbook" (published by Kogyo Chosa Kai), pages 794–799, "Plastic Additives Data Collection" (published by Kagaku Kogyo), pages 327–329, "Plastic Age Encyclopedia, Advance Edition 1986" (published by Plastic Age), pages 211–212, etc.

Various additives may be added to the layer polyolefin resin film of the invention. Examples of the additives are described below.

(1) Plasticizer;
   phthalic acid esters, glycol esters, fatty acid esters, phosphoric acid esters, etc.
(2) Stabilizer;
   lead compounds, cadmium compounds, zinc compounds, alkaline earth metal compounds, organic tin compounds, etc.
(3) Flame retardant;
   phosphoric acid esters, phosphoric acid ester halides, halides, inorganic materials, polyols containing phosphor, etc.
(4) Filler;
   alumina, kaolin, clay, calcium carbonate, mica, talc, titanium dioxide, silica, etc.
(5) Reinforcing agent;
   glass lobing, metallic fiber, glass fiber, glass milled fiber, carbon fiber, etc.
(6) Blowing agent;
   inorganic blowing agents (ammonium carbonate, sodium hydrogen carbonate), organic blowing agents (nitroso compounds, azo compounds), etc.
(7) Vulcanizing agent;
   vulcanization accelerator, acceleration assistant, etc.
(8) Deterioration preventing agent;
   ultraviolet absorber, metal deactivator, peroxide decomposing agent, etc.
(9) Coupling agent;
   silane compounds, titanium compounds, chromium compounds, aluminum compounds, etc.
(10) Nucleating agent;
   organic nucleating agents(dibenzylidene sorbitol compounds, etc.), inorganic nucleating agents (calcium carbonate, etc.)
(11) Various thermoplastic resins, rubbers The packaging material for photosensitive materials of the invention is suitable for packaging the following photosensitive materials.

Silver halide photographic photosensitive materials;
   X-ray films, films for printing, color photographic printing papers, color films, master papers for printing, DTR photosensitive materials, films and papers for computerized type-setting system, microfilms, films for movie, self-developing type photographic photosensitive materials, direct positive films and papers, etc.
Diazonium photographic photosensitive materials; 4-morpholinobenzene diazonium microfilms, microfilms, copying films, form plates for printing, etc.
Azide, diazide photographic photosensitive materials containing parazidobenzoate, 4,4'-diazidostilbene, etc., such as copying films and form plates for printing etc.
Quinone diazide photographic photosensitive materials; photosensitive materials containing ortho-quinone diazide compounds or ortho-naphthoquinone diazide compounds, such as benzoquinone-(1,2)-diazido-(2)-4-sulfonic acid phenyl ether, such as form plates for printing, copying films and contact printing film, etc.
Photo polymers; photosensitive materials, form plates for printing, contact printing films, containing vinyl compound monomer, etc.
Polyvinyl cinnamate esters; printing films, photoresists for IC, etc.

Moreover, the packaging material of the invention is also applicable to various photosensitive materials degraded or denatured by light, oxygen, sulfur dioxide gas or the like, such as foods including peanuts with butter, margarine, snacks, relishs, cakes, teas and lavers, medicines including powder and granular medicines placed in a bag for stomach and bowels and for cold, dyes, pigments, photographic developing agent, photographic fixing agent, toners and the like.

In the packaging material of the invention, the aluminum foil and the aluminum-metallized biaxially stretched thermoplastic resin film improve tearability by hand, and the polyolefin resin film improves impact puncture strength and anti-pinhole ability. The modified polyolefin resin adhesive layer joins the above layers in an adhesive strength near integrated, and improves tearability. The packaging material of the invention can be torn easily by hand, and therefore, taking out work is carried out safely and rapidly even in a dark room. Neverthless, the physical strength and tear strength are great and, light-shielding can be secured safely. Such a packaging material can be manufactured inexpensively.

Representative embodiments of the packaging materials of the invention are illustrated in FIGS. 1 through 6.

The packaging material of FIG. 1 is composed of the aluminum foil 1, the polyolefin resin film 3 laminated to one side of the aluminum foil 1 through the modified polyolefin resin adhesive layer 2, and a flexible sheet 5 laminated to the other side through an LDPE resin adhesive layer 4.

Figure 2:
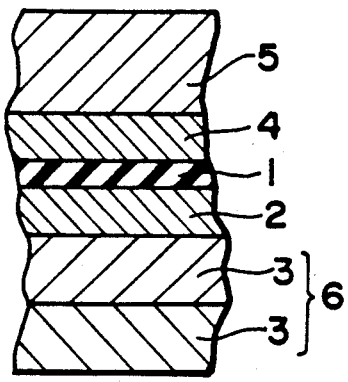

The packaging material of FIG. 2 is the same as the packaging material of FIG. 1, except that the polyolefin resin film 3 is a coextruded double layer film 6 consisting of two polyolefin resin film layers 3,3.

Figure 3:
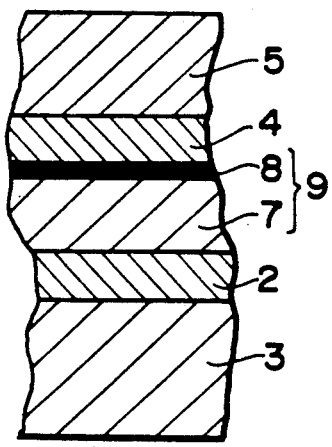

The packaging material of FIG. 3 is the same as the packaging material of FIG. 1, except that the aluminum foil 1 is replaced by the aluminum-metallized biaxially stretched thermoplastic resin film 9 consisting of the biaxially stretched thermoplastic resin film 7 and the aluminum membrane 8. The polyolefin resin film 3 is laminated to the opposite side to the aluminum membrane 8.

Figure 4:
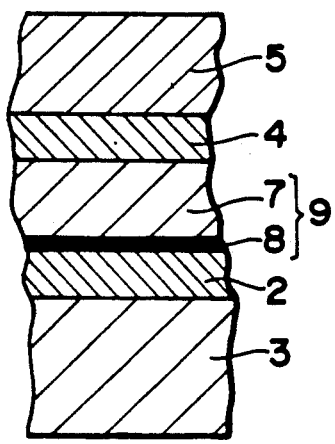

The packaging material of FIG. 4 is the same as the packaging material of FIG. 4, except that the aluminum-metallized biaxially stretched thermoplastic resin film 9 is turned out.

Figure 5:
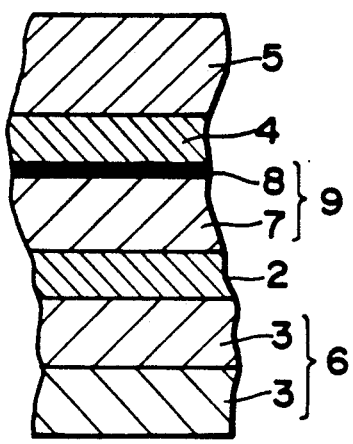

The packaging material of FIG. 5 is the same as the packaging material of FIG. 3, except that the polyolefin resin film is a coextruded double layer film consisting of two polyolefin resin film layer 3,3.

Figure 6:
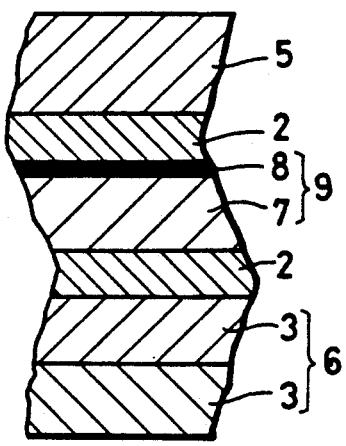

The packaging material of FIG. 6 is the same as the packaging material of FIG. 5, except that the LDPE resin adhesive layer 4 is replaced by the modified polyolefin resin adhesive layer 2.

Besides, the modified polyolefin resin adhesive layer 2 may be used instead of the LDPE resin adhesive layer 4 in FIGS. 1 through 5.

EXAMPLES

EXAMPLE 1

The packaging material of Example 1 corresponds to FIG. 1.

The aluminum foil 1 was an annealed soft aluminum foil 7 $\mu$m in thickness having an elongation at rupture of about 4% in both longitudinal and lateral directions.

The polyolefin resin film 3 was a light shielding LDPE/L-LDPE resin film 40 μm in thickness composed of 77 wt. % of LDPE resin having a MI of 2.4 g/10 minutes and a density of 0.923 g/cm$^3$, 20 wt. % of ethylene-butene-1 copolymer resin having a MI of 1.0 g/10 minutes and a density of 0.920 g/cm$^3$ and 3 wt. % of oil furnace carbon black having a pH of 8.0, a mean particle size of 21 mμ, a volatile component content of 0.8 wt. % and an oil absorption value of 76 ml/100 g. This film was molded by an inflation film molding machine at a blow-up ratio of 1:1.3. The elongation at rupture of the film was 611% in longitudinal direction and 687% in lateral direction.

As the modified polyolefin resin adhesive layer 2, 100 parts by weight of polyethylene resin having a MI of 5.1 g/10 minutes and a density of 0.919 g/cm$^3$ was mixed with 0.5 part by weight of radical initiator, 3 parts by weight of maleic anhydride, 0.1 part by weight of 2,6-di-t butyl-4-methylphenol and 0.1 part by weight of calcium stearate by a supermixer, and melted and then pelletized by an extruder with 40 m/m bent. The pellets were heated at 135° C. for 4 hours obtain graft-modified polyethylene resin (adhesive polyolefin resin) having maleic anhydride graft content of 1.5% which was measured by infrared spectra. 90 wt. % of LDPE resin having a MI of 7.0 g/10 minutes and a density of 0.918 g/cm$^3$ was mixed with 10 wt. % of the above graft-modified polyethylene resin, and extruded at 325° C. in a melted state to form the modified polyolefin resin adhesive layer 13 μm in thickness.

The flexible sheet 5 employed was a bleached kraft paper having a mean fiber length of more than 4 mm, a CPPA beating degree of 450 ml and an areal weight of 35 g/m$^2$ and containing 0.3 wt. % of polyacrylamide, a rosin sizing agent and barium sulfate as fixer. The flexible sheet 5 was laminated to the outside of the aluminum foil 1 through an LDPE resin adhesive layer 4 having a thickness of 15 μm composed of LDPE resin having a MI of 5.1 g/10 minutes and a density of 0.919 g/cm$^3$ at 330° C.

EXAMPLE 2

The packaging material of Example 2 was the same as Example 1, except that the thickness of the modified polyolefin resin adhesive layer 2 was changed from 13 μm to 20 μm.

EXAMPLE 3

The packaging material of Example 3 was the same as Example 1, except that the modified polyethylene resin content of the adhesive layer was changed from 10 wt. % to 25 wt. %, and therefore, the LDPE resin content was changed from 90 wt. % to 75 wt. %.

EXAMPLE 4

The packaging material of Example 4 was the same as Example 3, except that the thickness of the modified polyolefin resin adhesive layer 2 was changed from 13 μm to 20 μm.

EXAMPLE 5

The packaging material of Example 5 was the same as Example 1 except the kind of the adhesive polyolefin resin 2. The adhesive polyolefin resin used in this example was produced by mixing 100 parts by weight of propylene-ethylene random copolymer resin having an ethylene unit content of 3.0 wt. %, a MI of 3.5 g/10 minutes and a density of 0.90 g/cm$^3$, 2 parts by weight of maleic anhydride, 0.3 part by weight of radical initiator, 0.05 part by weight of 2,6-di-t-butyl-4-methylphenol and 0.1 part by weight of calcium stearate by a supermixer and treating in the same manner as Example 1 to obtain maleic anhydride-graft polypropylene resin having a maleic anhydride graft content of 0.6%.

EXAMPLE 6

The packaging material of Example 6 was the same as Example 5, except that the thickness of the modified polyolefin resin adhesive layer 2 was changed from 13 μm to 20 μm.

EXAMPLE 7

The packaging material of Example 7 was the same as Example 5, except that the modified polyethylene resin content of the adhesive layer was changed from 10 wt. % to 25 wt. %, and therefore, the LDPE resin content was changed from 90 wt. % to 75 wt. %.

EXAMPLE 8

The polyolefin resin film 3 was a light-shielding LDPE resin film 50 μm in thickness composed of 97 wt. % of LDPE resin having a MI of 2.4 g/10 minutes and a density of 0.923 g/cm$^3$ and 3 wt. % of the same oil furnace carbon black as Example 1 molded by an inflation film molding machine at a blow-up ratio of 1:1.3. The elongation at rupture of the film was 493% in longitudinal direction and 547% in lateral direction.

The polyolefin resin adhesive layer 2, the aluminum foil 1 and the flexible sheet 5 were the same as Example 1.

EXAMPLE 9

The packaging material of Example 9 corresponds to FIG. 2.

The coextruded double layer film 6 having a thickness of 40 μm was composed of a light-shielding LDPE resin film layer 3 having the same resin composition as Example 8 and a thickness of 20 μm and a light-shielding LDPE/L-LDPE resin film layer 3 having the same resin composition as Example 1 and a thickness of 20 μm. The elongation at rupture of the film was 564% in longitudinal direction and 652% in lateral direction. The coextruded double layer film 6 was laminated so that the light-shielding LDPE/L-LDPE resin film layer 3 was disposed as the inner surface layer being the heat sealing layer.

The other layers were the same as Example 1.

EXAMPLE 10

The packaging material of Example 10 corresponds to FIG. 3.

The aluminum-metallized biaxially stretched thermoplastic resin film 9 was composed of an aluminum membrane 8 400 Å in thickness and a biaxially stretched nylon resin film 7 15 μm in thickness. The elongation at rupture of the film was 78% in longitudinal direction and 83% in lateral direction.

The other layers were the same as Example 1.

EXAMPLE 11

The packaging material of Example 11 was the same as Example 10, except that the aluminum-metallized biaxially stretched thermoplastic resin film 9 was composed of an aluminum membrane 8 400 Å in thickness and a biaxially stretched polyester resin film 7 12 μm in thickness. The elongation at rupture was 197% in longitudinal direction and 236% in lateral direction.

EXAMPLE 12

The packaging material of Example 12 was the same as Example 9, except that the aluminum-metallized biaxially stretched thermoplastic resin film 9 of Example 11 was employed instead of the aluminum foil.

EXAMPLE 13

The packaging material of Example 13 was the same as Example 9, except that the flexible sheet 5 was a bleached kraft paper having a mean fiber length of less than 4 mm and an areal weight of 60 g/m².

EXAMPLE 14

The packaging material of Example 14 was the same as Example 1, except that the flexible sheet 5 was an unbleached kraft paper of pH 4.8 having an areal weight of 50 g/m² containing rosin-sizing agent, barium sulfate and polyacrylamide but substantially not containing oxidizing material or reducing material harmful for photographic photosensitive materials such as propylene oxide, formalin, melamine resin and sodium hypochlorite.

weight/number average molecular weight) of 3, 3 parts by weight of maleic anhydride, 0.5 part by weight of radical initiator, 0.1 part by weight of 2,6-di-t-butyl-4-methylphenol and 0.3 part by weight of calcium stearate by a supermixer and treating in the same manner as Example 1 to obtain maleic anhydride-graft L-LDPE resin having a maleic anhydride graft content of 0.7%.

The radical initiator employed the above examples was all t-butylhydroperoxide.

CONVENTIONAL EXAMPLE

The conventional packaging material was the same as Example 1, except that the modified polyolefin resin adhesive layer was relaced by an extrusion LDPE resin adhesive layer 13 μm in thickness composed of LDPE resin having a MI of 7.0 g/10 minutes and a density of 0.918 g/cm³ containing 0.1 wt. % of 2,6-di-t-4-methylphenol and 0.1 wt. % of calcium stearate.

In the above examples, the MI was measured according to ASTM D-1238 at 190° C., and the density was measured according to ASTM D-1505.

The layer composition of all examples are summarized in brief in Table 1. Various properties of the above packaging materials were measured, and the results are tabulated in Table 2.

TABLE 1

| | Al Foil or Aluminum-metallized biaxially stretched thermoplastic Resin Film | Modified Adhesive Layer | Polyolefin Film | LDPE Adhesive Layer | Flexible Sheet |
|---|---|---|---|---|---|
| Examples | | | | | |
| 1 | Al Foil 7 μm | Maleic Modified-PE 10 wt. % 13 μm | LDPE/L-LDPE 40 μm | LDPE 15 μm | Bleached kraft 35 g/m² |
| 2 | " | Maleic Modified-PE 10 wt. % 20 μm | LDPE/L-LDPE 40 μm | LDPE 15 μm | Bleached kraft 35 g/m² |
| 3 | " | Maleic Modified-PE 25 wt. % 13 μm | LDPE/L-LDPE 40 μm | LDPE 15 μm | Bleached kraft 35 g/m² |
| 4 | " | Maleic Modified-PE 25 wt. % 20 μm | LDPE/L-LDPE 40 μm | LDPE 15 μm | Bleached kraft 35 g/m² |
| 5 | " | Maleic Modified-PP 10 wt. % 13 μm | LDPE/L-LDPE 40 μm | LDPE 15 μm | Bleached kraft 35 g/m² |
| 6 | " | Maleic Modified-PP 10 wt. % 20 μm | LDPE/L-LDPE 40 μm | LDPE 15 μm | Bleached kraft 35 g/m² |
| 7 | " | Maleic Modified-PP 25 wt. % 13 μm | LDPE/L-LDPE 40 μm | LDPE 15 μm | Bleached kraft 35 g/m² |
| 8 | " | Same as Ex. 1 | LDPE 50 μm | LDPE 15 μm | Bleached kraft 35 g/m² |
| 9 | " | " | Ex. 1/Ex. 8 20 μm/20 μm | LDPE 15 μm | Bleached kraft 35 g/m² |
| 10 | Al-Nylon | " | Same as Ex. 1 | LDPE 15 μm | Bleached kraft 35 g/m² |
| 11 | Al-Polyester | " | " | LDPE 15 μm | Bleached kraft 35 g/m² |
| 12 | " | " | Same as Ex. 9 | LDPE 15 μm | Bleached kraft 35 g/m² |
| 13 | Same as Ex. 1 | " | " | LDPE 15 μm | Bleached kraft Short fiber |
| 14 | " | " | Same as Ex. 1 | LDPE 15 μm | Unbleached kraft |
| 15 | " | Maleic Modified-L-LDPE 25 wt. % 13 μm | " | LDPE 15 μm | Same as Ex. 13 |
| Conventional | " | LDPE 13 μm | " | LDPE 15 μm | Same as Ex. 1 |

EXAMPLE 15

The pckaging material of Example 15 was the same as Example 13 except for the adhesive polyolefin resin. The adhesive polyolefin resin used in this example was produced by mixing 100 parts by weight of L-LDPE resin having a butene-1 unit content of 5 wt. %, a MI of 2.0 g/10 minutes, a density of 0.919 g/cm³ and a molecular weight distribution (weight average molecular

TABLE 2

| | Adhesive Strength g/15 mm width | Tensile Strength (MD) kg/cm² | Tearability by Hand | Bursting Strength kg/cm² | Total Evaluation |
|---|---|---|---|---|---|
| Examples | | | | | |
| 1 | B 390 | B 5.9 | B | B 2.5 | B |
| 2 | A 470 | B 5.9 | A | B 2.7 | A |

TABLE 2-continued

|   | Adhesive Strength g/15 mm width | Tensile Strength (MD) kg/cm² | Tearability by Hand | Bursting Strength kg/cm² | Total Evaluation |
|---|---|---|---|---|---|
| 3 | B 420 | B 5.8 | B | B 2.5 | B |
| 4 | B 600 | B 5.9 | A | B 2.6 | A |
| 5 | B 400 | B 6.0 | B | B 2.6 | B |
| 6 | B 430 | B 6.1 | A | B 2.8 | A |
| 7 | B 450 | B 6.0 | B | B 2.6 | B |
| 8 | B 370 | B 6.1 | C | B 2.5 | B |
| 9 | B 450 | B 6.1 | B | B 2.7 | B |
| 10 | B 600 | B 6.8 | A (with V Notch) | B 5.3 | A |
| 11 | B 580 | B 7.3 | A (with V Notch) | B 3.6 | A |
| 12 | A 800 | B 7.6 | A (with V Notch) | B 3.8 | A |
| 13 | A 600 | A 9.5 | A | B 2.9 | A |
| 14 | B 420 | A 9.1 | B | B 2.9 | A |
| 15 | B 640 | B 9.4 | A | B 2.8 | A |
| Conventional | B 40 | B 5.8 | E | B 2.4 | E |

Evaluations in Table 2 were carried out as follows:

| A | very excellent | B | excellent |
|---|---|---|---|
| C | practical | D | having a problem |
| E | impractical | | |

Testing methods were as follows:

Adhesive Strength:
  The adhesive strength between the aluminum foil and the polyolefin resin film and between the aluminum-metallized biaxially stretched thermoplastic resin film and the polyolefin resin film was measured by 180 degrees peeling method using a peeling tester "TENSILON UTM-III-100" (ORIENTEC) at a peeling speed of 100 mm/min.

Tensile Stregnth (MD):
  According to JIS P-8113.

Tearability by Hand:
  Four-sided fin seal flat bag was prepared, and the tearability by hand and the linearity of the torn portion in both the longitudinal and lateral directions were judged collectively. In the case of the packaging materials containing the aluminum metallized biaxially stretched thermoplastic resin film, the tearability at the V-notched portion was evaluated.

Bursting Strength:
  According to JIS P-8112.

Total Evaluation:
  Judged by the tearability, physical strength, cost and the like collectively.

I claim:

1. A packaging material for photosensitive materials which comprises an aluminum foil and a polyolefin resin film having an elongation at rupture in either of longitudinal or lateral direction of more than 1.5 times of that of the aluminum foil laminated thereto through a modified polyolefin resin adhesive layer containing an adhesive polyolefin resin which is a graft modified polyolefin resin that is graft modified with at least one unsaturated carboxylic acid compound.

2. A packaging material for photosensitive materials which comprises an aluminum-metallized biaxially stretched thermoplastic resin film and a polyolefin resin film having an elongation at rupture in either of longitudinal or lateral direction of more than 1.5 times of that of said aluminum-metallized film laminated thereto through a modified polyolefin resin adhesive layer containing an adhesive polyolefin resin which is a graft modified polyolefin resin that is graft modified with at least one unsaturated carboxylic acid compound.

3. The packaging material of claim 1 or claim 2 wherein the adhesive strength between the aluminum foil or the aluminum-metallized film and the polyolefin resin film is greater than 300 g/15 mm width.

4. The packaging material of claim 1 or claim 2 wherein the content of said adhesive polyolefin resin is 7 to 70 wt. % and the thickness of said modified polyolefin resin adhesive layer is 10 to 60 μm.

5. The packaging material of claim 1 or claim 2 wherein the elongation at rupture of said aluminum foil or aluminum-metallized film is less than 300% in both longitudinal and lateral direction.

* * * * *